United States Patent
Kakinuma

(10) Patent No.: US 7,124,016 B2
(45) Date of Patent: Oct. 17, 2006

(54) VEHICLE-MOUNTED CONTROL SYSTEM AND METHOD FOR AN INTERNAL COMBUSTION ENGINE

(75) Inventor: Hiroyuki Kakinuma, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 11/155,703

(22) Filed: Jun. 17, 2005

(65) Prior Publication Data

US 2006/0020385 A1 Jan. 26, 2006

(30) Foreign Application Priority Data

Jul. 21, 2004 (JP) ............. 2004-213317

(51) Int. Cl.
- G06F 19/00 (2006.01)
- B60K 28/14 (2006.01)
- B62D 49/08 (2006.01)

(52) U.S. Cl. ............ 701/112; 180/283; 180/284
(58) Field of Classification Search .......... 701/45, 701/50, 101–103, 112; 180/65.3, 65.4, 271, 180/282, 283, 284, 285; 200/61.45 R, 61.47, 200/220

See application file for complete search history.

(56) References Cited

U.S. PATENT DOCUMENTS

| | | | | | |
|---|---|---|---|---|---|
| 2,692,312 | A | * | 10/1954 | West ................. | 200/220 |
| 3,671,933 | A | * | 6/1972 | Barnes ............... | 200/61.45 R |
| 3,787,647 | A | * | 1/1974 | Hughes .............. | 200/220 |
| 3,882,957 | A | * | 5/1975 | Fritz ................. | 180/284 |
| 6,766,874 | B1 | * | 7/2004 | Naito et al. ......... | 180/65.3 |
| 6,941,206 | B1 | | 9/2005 | Hasegawa et al. | |
| 2002/0027037 | A1 | | 3/2002 | Yamamoto et al. | |
| 2004/0050609 | A1 | | 3/2004 | Machida et al. | |
| 2006/0054375 | A1 | * | 3/2006 | Kakinuma ........... | 180/282 |

FOREIGN PATENT DOCUMENTS

| | | | | |
|---|---|---|---|---|
| DE | 3714111 | | 12/1988 | |
| EP | 1304544 | | 4/2003 | |
| JP | 9-65811 A | * | 3/1997 | ......... 701/112 |
| JP | 2000204994 A | * | 7/2000 | ......... 701/112 |
| JP | 2002-47962 A | * | 2/2002 | ......... 701/112 |
| JP | 2002-068062 | | 3/2002 | |
| JP | 2005-188367 A | * | 7/2005 | ......... 701/112 |

* cited by examiner

Primary Examiner—Willis R. Wolfe, Jr.
(74) Attorney, Agent, or Firm—Carrier, Blackman & Associates, P.C.; William D. Blackman; Joseph P. Carrier

(57) ABSTRACT

A vehicle-mounted internal combustion engine controller is provided that can properly stop an internal combustion engine in accordance with an operational state no matter whether a vehicle body is inclined. The vehicle-mounted internal combustion engine controller comprises an inclination sensor for detecting vehicle body inclination; a mechanism for determining the operational state of a combustion engine; and a controller for stopping the operation of the combustion engine in accordance with a vehicle body inclination and an operational state. The cutoff mechanism stops the operation of the vehicle-mounted internal combustion engine when it is judged that a vehicle body inclination angle α detected by the inclination sensor is greater than a predetermined angle A for a greater or equal period of time as a threshold stop time T1, T2 setting, which varies with the operational state determined by the operational state sensor.

13 Claims, 3 Drawing Sheets

VEHICLE-MOUNTED CONTROL SYSTEM AND METHOD FOR AN INTERNAL COMBUSTION ENGINE

CROSS-REFERENCE TO RELATED APPLICATIONS

The present invention claims priority under 35 USC 119 based on Japanese patent application No. 2004-213317, filed on Jul. 21, 2004. The subject matter of this priority document is incorporated by reference herein.

BACKGROUND OF THE INVENTION

1. Field of the Invention

The present invention relates to a vehicle-mounted engine control system and method for an internal combustion engine, in which the system includes a control unit and an inclination sensor for detecting a vehicle body inclination.

2. Description of the Background Art

The applicant of the present invention previously filed an application for a patent, JP-A No. 68062/2002, to disclose a motorcycle-mounted internal combustion engine controller that includes an inclination sensor for detecting a vehicle body inclination.

The controller disclosed in JP-A No. 68062/2002 includes an inclination sensor. A plumb bob is suspended within a case, which is integral with a vehicle body, and allowed to swing from right to left and vice versa. The inclination sensor detects a vehicle body inclination by determining a relative angle that is formed between the plumb bob, which constantly indicates verticality, and the case, which inclines together with the vehicle body. The controller stops the operation of the internal combustion engine when a predetermined period of time is exceeded by the period during which a vehicle body inclination angle detected by the inclination sensor is greater than a predetermined angle.

When, for instance, the vehicle body repeatedly inclines, the plumb bob may temporarily swing from the vertical. Therefore, the inclination sensor may erroneously detect an undue vehicle body inclination that is greater than the actual one. When such erroneous detection of vehicle body inclination occurs, there is no need to stop the internal combustion engine.

The above-mentioned erroneous vehicle body inclination detection is temporary. The internal combustion engine is stopped only when a vehicle body inclination is continuously detected for a certain period of time. Therefore, the internal combustion engine does not stop in the event of an erroneous or short-term temporary vehicle body inclination detection.

Although the known devices have some utility for their intended purposes, a need still exists in the art for a vehicle control system having an improved threshold stop time setting. The threshold stop time setting of the previously known system, which defines the vehicle body inclination period, is constant no matter what operational state the internal combustion engine is in. Therefore, the threshold stop time setting defined in JP-A No. 68062/2002 may unexpectedly stop the operation of the internal combustion engine depending on its operational state.

SUMMARY OF THE INVENTION

The present invention provides a control system and method for a vehicle having an internal combustion engine. It is an object of the present invention to provide a vehicle-mounted internal combustion engine controller that can appropriately stop the internal combustion engine in accordance with the operational state of the internal combustion engine.

In accomplishing the above object, according to a first aspect of the present invention, there is provided a vehicle-mounted internal combustion engine control system including an inclination sensor for detecting a vehicle body inclination; an operational state sensor for determining the operational state of a vehicle-mounted internal combustion engine; and a cutoff mechanism for stopping operation of the vehicle-mounted internal combustion engine in accordance with a number of pre-selected conditions. The cutoff mechanism is operated by the controller, based on input from the inclination sensor and the operational state sensor. The cutoff mechanism is operable to stop the vehicle-mounted internal combustion engine when the vehicle body inclination angle detected by the inclination sensor is greater than a predetermined angle for a period that is equal to or greater than a threshold stop time setting, which varies with the operational state determined by the operational state sensor.

An appropriate threshold stop time setting is defined for each of various internal combustion engine states. A proper threshold stop time setting is selected in accordance with the operational state that is determined by the operational state sensor. The operation of the internal combustion engine is stopped when it is judged that the vehicle body inclination angle detected by the inclination sensor is greater than the predetermined angle for a period of time that is equal to or greater than the threshold stop time setting. Therefore, the internal combustion engine can be properly stopped in accordance with the operational state.

According to a second aspect of the present invention, the operational state sensor in the vehicle-mounted internal combustion engine controller determines whether the vehicle-mounted internal combustion engine is an initial startup state.

The internal combustion engine is warming up during an initial startup state, which prevails for a certain period of time after engine startup. The initial startup state differs from a warmed-up operational state that arises after the initial startup state. Therefore, the threshold stop time setting, for stopping the operation of the internal combustion engine, is changed after the engine has warmed up, so as to properly stop the internal combustion engine in accordance with the operational state.

According to a third aspect of the present invention, the threshold stop time setting of the controller, for a situation where the operational state is an initial startup, is longer than the threshold stop time setting for a situation where the operational state is not an initial startup state.

Therefore, when the vehicle body inclination angle is greater than a predetermined angle, the internal combustion engine can be properly stopped in accordance with the operational state.

As far as an appropriate threshold stop time setting is defined for an operational state arising after the initial startup state, it is possible to prevent the internal combustion engine from coming to a stop when a leftward, rightward, or other vehicle body inclination is detected erroneously.

According to a fourth aspect of the present invention, when the engine coolant temperature of the vehicle-mounted internal combustion engine is not higher than a predetermined temperature, the operational state sensor determines that the vehicle-mounted internal combustion engine is in an initial startup state.

While the internal combustion engine is in an initial startup state, the engine coolant temperature is relatively low. When the engine coolant temperature is not higher than the predetermined temperature, it is possible to judge that the internal combustion engine is in an initial startup state.

According to a fifth aspect of the present invention, when the engine coolant temperature of the vehicle-mounted internal combustion engine is lower than an outside air temperature, and particularly when it is lower by a predetermined temperature value, the operational state sensor determines that the vehicle-mounted internal combustion engine is in an initial startup state.

When the internal combustion engine is in an initial startup state, the engine coolant temperature may be lower than the outside air temperature. When the engine coolant temperature is lower than the outside air temperature by the predetermined temperature value, it is possible to judge that the internal combustion engine is in an initial startup state.

According to a sixth aspect of the present invention, the cutoff mechanism may stop the operation of the vehicle-mounted internal combustion engine by varying the fuel injection timing or the ignition timing from the normal timing thereof.

When the operation of the internal combustion engine is to be stopped in a situation where the vehicle body inclination angle is greater than a predetermined angle, control is exercised so that fuel injection timing or ignition timing differs from normal timing. Therefore, the internal combustion engine is operated in a manner that is not normal, and then stopped. Consequently, a feeling that is different from a normal one is given to the rider to inform the rider in advance that the engine is about to stop.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a block diagram illustrating a control system for the internal combustion engine of FIG. 2; and.

DETAILED DESCRIPTION OF THE PREFERRED EMBODIMENTS

Figure 1:
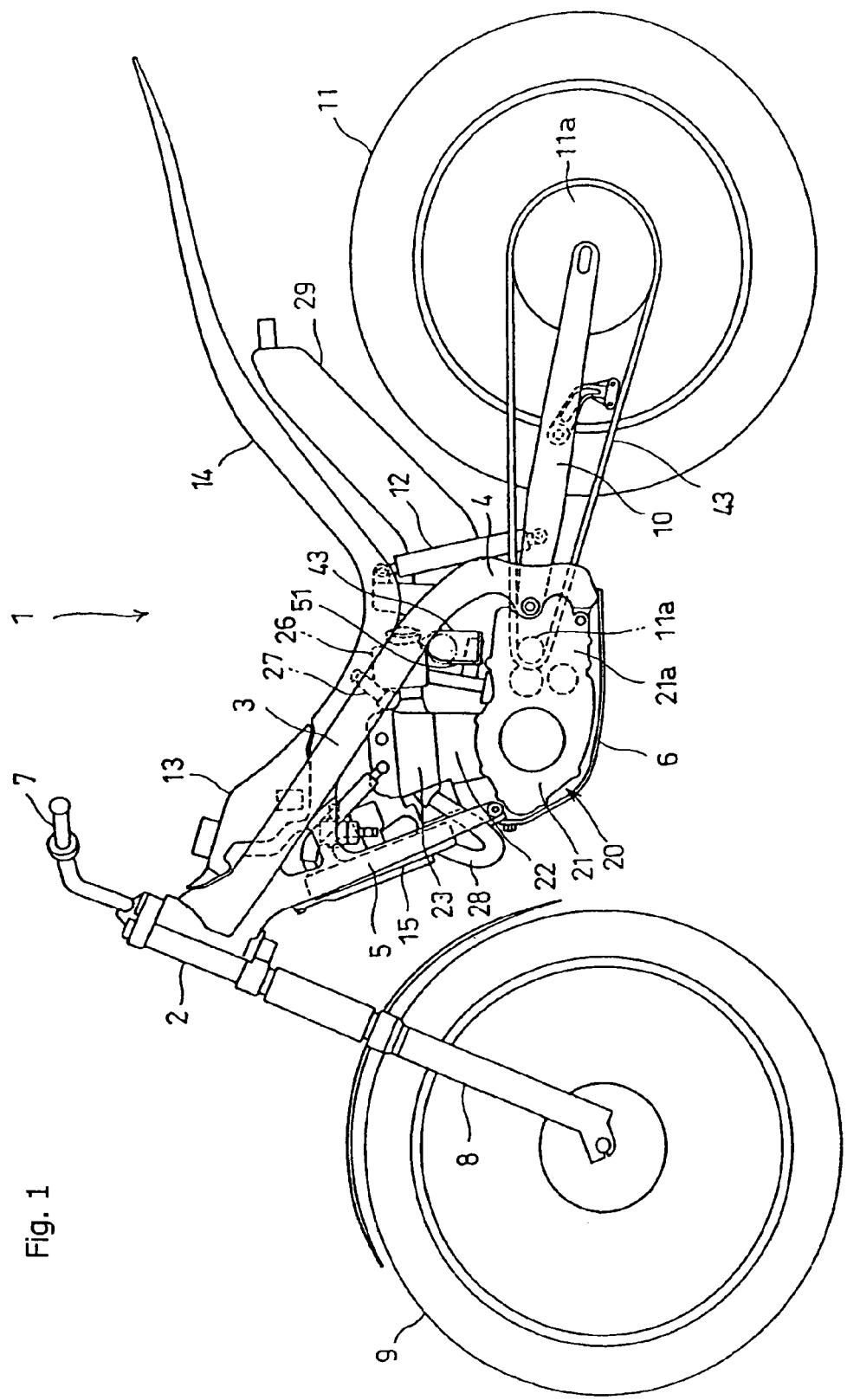
FIG. 1 is an overall side plan view of a motorcycle incorporating a control system according to an illustrative embodiment of the present invention.

A selected illustrative embodiment of the present invention will now be described, with reference to FIGS. 1 to 4.

The present embodiment applies to an off-road motorcycle 1, sometimes referred to as a dirt bike. The motorcycle 1 includes a main frame 3, a center frame 4, and a down frame 5. The main frame 3, which is attached to a head pipe 2, is sloped downward slightly and rearward from the head pipe, and is forked into right- and left-hand parts. The center frame 4 is integrally attached to the rear of the main frame 3 and extends downwardly therefrom. The down frame 5, which is also attached to the head pipe 2, is sloped significantly downward and rearward below the main frame, and the down frame is also forked into right- and left-hand parts.

An internal combustion engine 20 is suspended between the down frame 5, which is at the front of the motorcycle 1, and the center frame 4, which is at the rear of the motorcycle 1. The underside of the internal combustion engine 20 is covered by a lower engine cover plate 6, for protection purposes. The lower engine cover plate 6 is longitudinally installed between the lower ends of the down frame 5 and center frame 4.

A front fork 8 rotates in common with a handlebar 7, which is supported by the head pipe 2, and extends upward, and spread rightward and leftward. The front fork 8 is extends downwardly from the head pipe 2. A front wheel 9 is rotatably supported at the lower end of the front fork 8. A rear fork 10 is supported, at a front end thereof, by the lower end of the center frame 4, so that the rear fork 10 is reciprocally movable in a vertical direction, supported by a shock absorber 12. A rear wheel 11 is supported on the rear end of the rear fork 10, and the rear shock absorber 12 is installed between the rear fork 10 and vehicle body frame.

A fuel tank 13 is mounted above the internal combustion engine 20 and supported by the main frame 3, which is located behind the head pipe 2. A sheet 14 is positioned behind the fuel tank 13.

A radiator 15 is installed between the right- and left-hand parts of the down frame 5.

Figure 2:
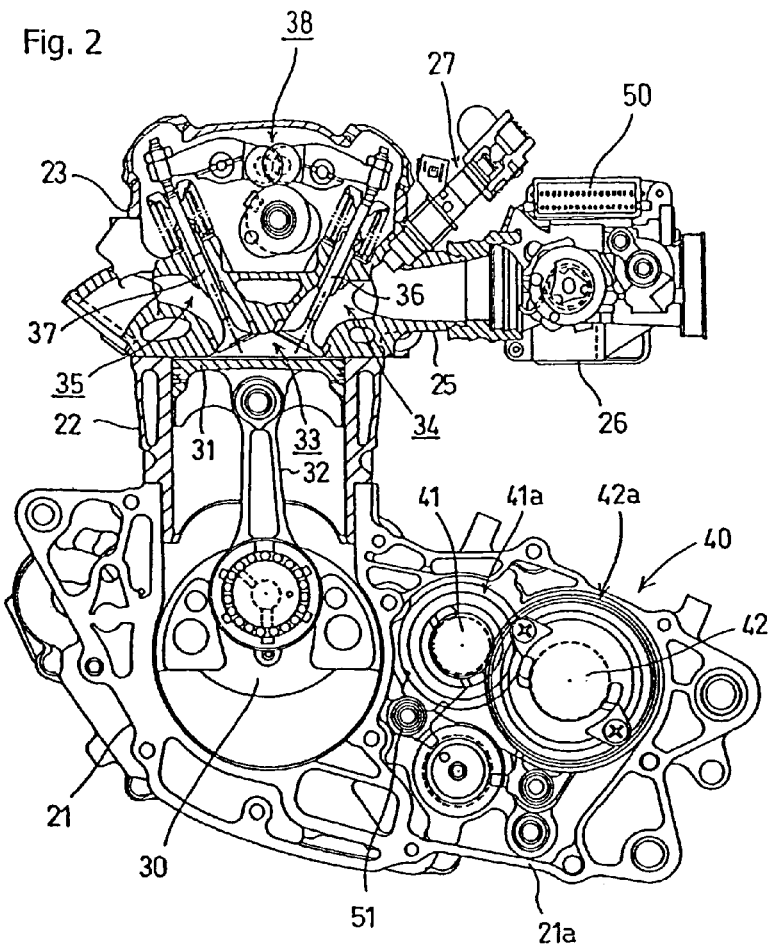
FIG. 2 is a cross-sectional view of an internal combustion engine that is mounted in the motorcycle of FIG. 1.

In the depicted embodiment, the internal combustion engine 20 is a single-cylinder, four-stroke cycle, OHC internal combustion engine. As shown in FIG. 2, the engine 20 includes a crankcase 21, with a cylinder 22 and a cylinder head 23 protruding substantially vertically upwardly from the crankcase 21. An intake-connecting pipe 25 is attached to the cylinder head 23, extends rearwardly, and is coupled to a throttle body 26. A fuel injector 27 is mounted to the intake-connecting pipe 25, with a spray tip of the injector disposed in fluid communication with the passage formed inside of the intake-connecting pipe 25. An exhaust pipe 28, which is attached to the cylinder head 23 and extends forward, is routed to the right of the cylinder 22, then extends rearward, and is coupled to a muffler 29.

A connecting rod 32 is coupled between a crank pin of a crankshaft 30, which is positioned within the crankcase 21 and oriented in the left-right direction of the vehicle body, and a piston pin of a piston 31, which reciprocates within the cylinder 22. A combustion chamber 33 is formed below an underside of the cylinder head 23 that faces the top face of the piston 31. An intake port 34 and an exhaust port 35 are formed over openings in the combustion chamber 33. The intake port 34 connects with the intake-connecting pipe 25. The exhaust port 35 connects with the exhaust pipe 28.

The opening in the intake port 34 is opened and closed by an intake valve 36. The opening in the exhaust port 35 is opened and closed by an exhaust valve 37. The intake valve 36 and exhaust valve 37 are driven by a valve train 38, which is mounted in a space above the cylinder head 23.

A transmission case 21*a* is provided behind the crankcase 21. A transmission 40 is mounted inside the transmission case 21*a*. The transmission 40 comprises a main shaft 41 and a counter shaft 42, which are longitudinally arranged and oriented in a left-right horizontal direction, as is the case with the crankshaft 30. Gear trains 41*a*, 42*a* engage with the main shaft 41, counter shaft 42, and each other.

The motive power of the crankshaft 30 is transmitted to the main shaft 41 via a gear pair and a clutch (not shown). It is further transmitted to the counter shaft 42 through the gear trains 41*a*, 42*a*.

The counter shaft 42 is an output shaft. A chain 43 is set between a drive sprocket 42a and a driven sprocket 11a. The drive sprocket 42a is attached to the end of the counter shaft 42, which protrudes out of the transmission case 21a. The driven sprocket 11a is attached to a rear axle of the rear wheel 11. Therefore, the rotation of the counter shaft 42 is transmitted to the rear wheel 11 via the chain 43. As a result, the rear wheel 11 rotates, thereby allowing the motorcycle to run.

An inclination sensor 51, which is positioned above the transmission case 21a and substantially below the throttle body 26, is mounted on the main frame via a bracket (not shown). The inclination sensor 51 may include a plumb bob suspended within a case, which is integral with the vehicle body, and acts as a pendulum, swinging from right to left and vice versa. The inclination sensor detects a vehicle body left-right inclination angle by determining a relative angle that is formed between the plumb bob, which constantly indicates verticality, and the case, which inclines together with the vehicle body.

The throttle body 26, which belongs to an intake system, is provided with a throttle position sensor 52 for detecting the opening of a throttle valve. Further, the throttle body 26 incorporates a control circuit board, which carries an electronic control unit (ECU) 50. An engine speed sensor 53 is positioned along the outer circumference of a crank web of the crankshaft 30. The radiator 15 is provided with a water temperature sensor 54, which detects the temperature of coolant.

Figure 3:
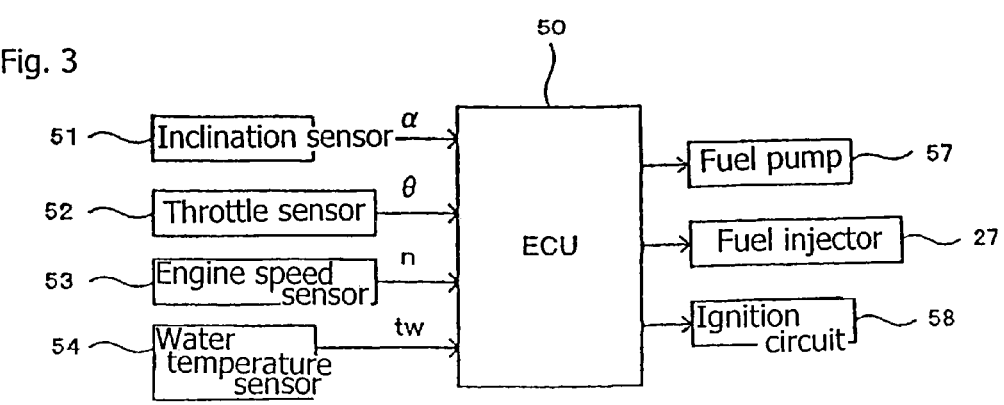

FIG. 3 outlines an ECU-based stop control system for the internal combustion engine.

A vehicle body inclination angle $\alpha$, which is detected by the inclination sensor 51, a throttle angle $\theta$, which is detected by the throttle position sensor 52, an engine speed n, which is detected by the engine speed sensor 53, and a water temperature tw, which is detected by the water temperature sensor 54, are received by the ECU 50. The ECU 50 outputs the associated control signals to a fuel pump 57, the fuel injector 27, and an ignition circuit 58.

Figure 4:
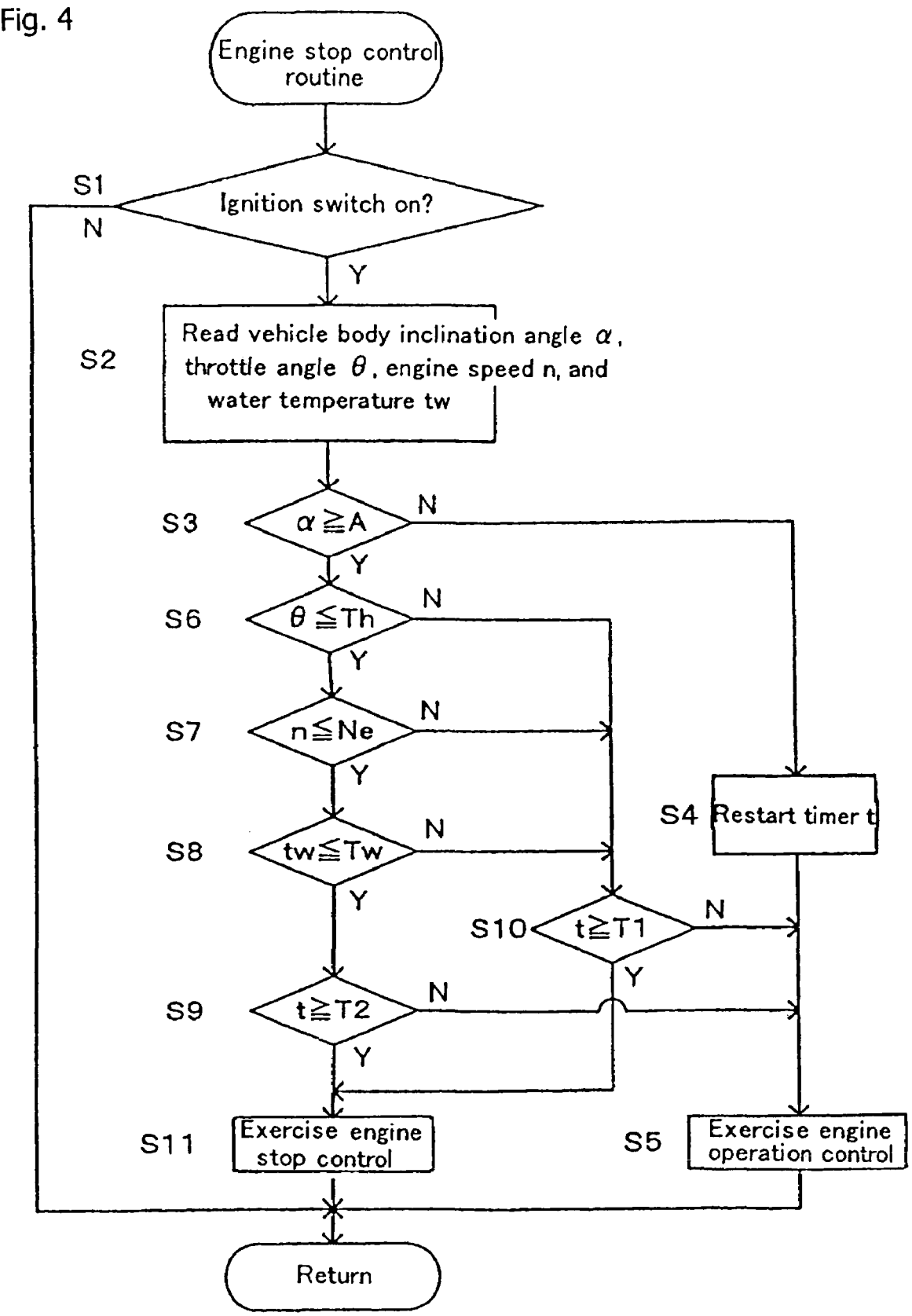
FIG. 4 is a flowchart illustrating internal combustion engine operation stop control steps that are performed by the operation stop control system of FIG. 3.

FIG. 4 illustrates the stop control steps that the stop control system performs for the internal combustion engine 20.

Step 1 is performed to determine whether an ignition switch is on. When the ignition switch is on, the program flow proceeds to step 2. Step 2 is performed to read the vehicle body inclination angle $\alpha$, throttle angle $\theta$, engine speed n, and water temperature tw.

Next, step 3 is performed to judge whether the vehicle body inclination angle $\alpha$ is not smaller than a predetermined angle A. The vehicle body inclination angle $\alpha$ is a left-right vehicle body inclination angle from the vertical ($\alpha=0$). The vehicle body inclination angle $\alpha$ increases with an increase in the degree of vehicle body inclination.

If the attitude of the vehicle body is such that the vehicle body inclination angle $\alpha$ is smaller than the predetermined angle A, the program flow proceeds from step 3 to step 4. Step 4 is performed to restart a timer. More specifically, the timer starts counting with the timer count t reset to 0. Step 5 is then performed to exercise operation control over the internal combustion engine 20. The program flow then returns to step 1.

If the vehicle body inclination angle $\alpha$ is smaller than the predetermined angle A ($\alpha<A$) with the ignition switch turned on, steps 1 through 5 are repeated to start the timer from a count of zero and continuously operate the internal combustion engine 20.

If the vehicle body inclination angle $\alpha$ is not smaller than the predetermined angle A ($\alpha \geq A$), the program flow proceeds from step 3 to step 6. Step 6 is performed to judge whether the throttle angle $\theta$ is not greater than a predetermined opening Th (e.g., 30%). If $\theta \leq Th$, the program flow proceeds to step 7. If $\theta>Th$, the program flow jumps to step 10.

In step 7, which is followed when $\theta \leq Th$, the engine speed n is checked to judge whether it is not greater than a predetermined speed Ne (e.g., 5000 rpm). If $n \leq Ne$, the program flow proceeds to step 8. If $n>Ne$, the program flow jumps to step 10. In step 8, which is followed when $n \leq Ne$, the water temperature tw is checked to judge whether it is not higher than a predetermined water temperature Tw (e.g., 90° C.). If $tw \leq Tw$, the program flow proceeds to step 9. If $tw>Tw$, the program flow jumps to step 10.

If $\theta \leq Th$, $n \leq Ne$, and $tw \leq Tw$, the internal combustion engine is in an initial startup state. In such an instance, the program flow proceeds to step 9. Step 9 is performed to judge whether the count t reached by the timer (step 4), which is restarted immediately before the inclination angle $\alpha$ exceeds the predetermined angle A, is equal to or greater than a predetermined threshold stop time T2 (5 to 10 seconds). Before the threshold stop time T2 is reached by the count t, step 5 is followed to continuously exercise operation control over the internal combustion engine 20. After the threshold stop time T2 is exceeded by the count t, step 11 is followed to exercise control so as to stop the operation of the internal combustion engine 20.

If one or more of the above-mentioned three conditions ($\theta \leq Th$, $n \leq Ne$, and $tw \leq Tw$) are not met, it is concluded that the internal combustion engine is not in an initial startup state. The program flow then jumps to step 10. Step 10 is performed to judge whether the count t reached by the timer (step 4), which is restarted immediately before the inclination angle $\alpha$ exceeds the predetermined angle A, is equal to or greater than a predetermined threshold stop time T1 (1 or 2 seconds). Before the threshold stop time T1 is reached by the count t, step 5 is followed to continuously exercise operational control over the internal combustion engine 20. After the threshold stop time T1 is exceeded by the count t, step 11 is followed to exercise control so as to stop the operation of the internal combustion engine 20.

Operation stop control is exercised over the internal combustion engine 20 to stop its operation by deactivating the ignition function of the ignition circuit 58, the fuel injection function of the fuel injector 27, and the drive function for the fuel pump 57.

As regards when the threshold stop time setting for stopping the internal combustion engine when the vehicle body inclination angle $\alpha$ is not smaller than the predetermined angle A, the threshold stop time T2 for an initial startup state is longer than the threshold stop time T1 for a normal operational state.

Meanwhile, the internal combustion engine water temperature is generally higher in the normal operational state than in the initial startup state. Therefore, when the water temperature Tw of the internal combustion engine 20 is detected in accordance with the present embodiment, it is possible to judge whether the internal combustion engine 20 is in the initial startup state.

When the threshold stop time setting is greater than for the normal operational state in a situation where the internal combustion engine 20 is in the initial startup state, the following advantages are provided.

When, for instance, the control configuration according to the present invention is applied to an off-road vehicle or other all-terrain vehicles, the internal combustion engine may be started with the vehicle inclined for the purpose of facilitating a kick or other operation. In such an instance, it is possible to prevent the internal combustion engine from coming to an immediate stop by employing a longer threshold stop time than for the normal operational state even when a vehicle body inclination is detected. In other words, the internal combustion engine can be properly stopped in accordance with the vehicle operational state.

Threshold stop time T1 is provided for the normal operational state although it is shorter than the threshold stop time for the initial startup time. Even when erroneous vehicle body inclination detection occurs due, for instance, to a left-right vehicle body inclination, such detection is temporary (lasts for a shorter period of time than threshold stop time T1). Therefore, it is possible to prevent the internal combustion engine from being stopped by an erroneous detection.

Internal combustion engine operation stop control in step 11 may be provided in such a manner as to stop the operation after exercising drive control while either the fuel injection timing for the fuel injector 27 or the ignition timing for the ignition circuit 58 is varied from the normal timing.

For example, internal combustion engine operation stop control may be exercised so as to reduce the frequency of fuel injection and ignition for a period of the first two seconds or so. More specifically, the fuel injection and ignition operation may be performed every four engine (crankshaft) revolutions although it is normally performed every two engine revolutions.

By deactivating the ignition function of the ignition circuit 58, the fuel injection function of the fuel injector 27, and the drive function for the fuel pump 57, the engine operation may be stopped in approximately two seconds.

When operation stop control is exercised as described above, the rider feels that the operational state of the internal combustion engine 20 is different from normal, and recognizes that the internal combustion engine 20 is about to stop.

Step 8 in the flowchart shown in FIG. 4 is performed to judge whether the water temperature tw is not higher than the predetermined temperature Tw. Alternatively, however, step 8 may be performed to judge whether the water temperature tw is lower than the outside air temperature ta by the predetermined temperature value (e.g., 30° C.).

More specifically, step 8 may be performed to judge whether tw≦ta+30° C. If tw≦ta+30° C., it can be concluded with increased certainty that the internal combustion engine is in the initial startup state. When the condition (tw≦ta+30° C.) is met, the program flow may proceed to step 9. If the condition is not met, the program flow may jump to step 10.

It will be seen from the foregoing discussion that the present invention provides an improved system and method for controlling operation of an internal combustion engine, and for interrupting operation of the engine when certain predetermined conditions are met, with particular attention paid to a tilt angle of the vehicle.

Although the present invention has been described herein with respect to a limited number of presently preferred embodiments, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having thus, described the invention, what is claimed is:

1. A vehicle-mounted internal combustion engine control system, comprising:
an inclination sensor for detecting a vehicle body inclination;
an operational state sensor for determining the operational state of a vehicle-mounted internal combustion engine; and
a cutoff mechanism for stopping the operation of the vehicle-mounted internal combustion engine in accordance with a vehicle body inclination detected by the inclination sensor and an operational state determined by the operational state sensor,
wherein the cutoff mechanism is operable to stop operation of the vehicle-mounted internal combustion engine when it is judged that a time period, during which a vehicle body inclination angle detected by the inclination sensor is greater than a predetermined angle, is equal to or greater than a threshold stop time setting,
wherein the threshold stop time setting depends on the operational state determined by the operational state sensor.

2. The control system according to claim 1, wherein the cutoff mechanism stops the operation of the vehicle-mounted internal combustion engine by varying at least one of the fuel injection timing and ignition timing from a normal timing thereof.

3. The control system according to claim 1, wherein the operational state sensor is operable to determine whether the vehicle-mounted internal combustion engine is an initial startup state or in a warmed-up operational state.

4. The control system according to claim 3, wherein the threshold stop time setting when the operational state is an initial startup state is set to be longer than the threshold stop time setting when the operational state is a warmed-up operational state.

5. The control system according to claim 3, wherein the operational state sensor determines whether the vehicle-mounted internal combustion engine is in the initial startup state or in the warmed-up state based in part on a measurement of engine coolant temperature.

6. The control system according to claim 3, wherein the operational state sensor judges that the vehicle-mounted internal combustion engine is in an initial startup state when the engine coolant temperature of the vehicle-mounted internal combustion engine is lower than an outside air temperature.

7. A method of controlling an internal combustion engine of a vehicle using a controller, the method comprising the steps of:
monitoring vehicle inclination data from an inclination sensor on a vehicle;
detecting an operational state of the engine, based on input from sensed vehicle data;
selecting a threshold time setting based on the detected operational state of the engine, wherein the threshold stop time setting varies with the detected operational state;
starting a timer running when the sensed vehicle inclination detected by the inclination sensor becomes greater than a predetermined angle; and
stopping operation of the internal combustion engine with a cutoff mechanism when the time period during which a vehicle body inclination angle detected by the inclination sensor is greater than a predetermined angle is equal to or greater than the selected threshold stop time setting.

8. The method of controlling an internal combustion engine according to claim 7, wherein the operational state of the engine comprises one of an initial startup state, and a warmed-up state, and wherein a first a threshold stop time setting is used by the operational state judgement device when the engine is in an initial startup state, and wherein a second threshold stop time setting is used by the operational state judgement device when the engine is in a warmed-up state.

9. The method of controlling an internal combustion engine according to claim 8, wherein the first threshold stop time setting is longer that the second threshold stop time setting.

10. The method of controlling an internal combustion engine according to claim 8, wherein the operational state of the engine is determined to be in a warmed-up state based on a sensed throttle angle, a sensed engine speed, and a sensed temperature of coolant of a cooling system of the engine such that when at least one of the throttle angle is greater than a predetermined throttle angle threshold, the engine speed is greater than a predetermined engine speed threshold, and the coolant temperature is greater than a predetermined temperature threshold, the engine is determined to be in a warmed-up operational state.

11. The method of controlling an internal combustion engine according to claim 8, wherein the operational state of the engine is determined to be in an initial startup state based on a sensed throttle angle, a sensed engine speed, and a sensed temperature of coolant of a cooling system of the engine such that when the throttle angle is less than or equal to a predetermined throttle angle threshold, the engine speed is less than or equal to a predetermined engine speed threshold, and the coolant temperature is lower than the outside air temperature by predetermined amount, the engine is determined to be in an initial startup state.

12. The method of controlling an internal combustion engine according to claim 8, wherein the operational state of the engine is determined to be in an initial startup state based on a sensed throttle angle, a sensed engine speed, and a sensed engine coolant temperature, such that when the throttle angle is less than or equal to a predetermined throttle angle threshold, the engine speed is less than or equal to a predetermined engine speed threshold, and the coolant temperature is less than or equal to a predetermined temperature threshold, the engine is determined to be in an initial startup state.

13. The method of controlling an internal combustion engine according to claim 12, wherein the cutoff mechanism stops the operation of the internal combustion engine by controlling the function of at least one of an ignition circuit, a fuel injector, and a fuel pump.

* * * * *